United States Patent [19]

Nakamura et al.

[11] Patent Number: 4,649,232

[45] Date of Patent: Mar. 10, 1987

[54] ELECTROGRAPHIC APPARATUS

[75] Inventors: Shiochiro Nakamura, Columbus; Robert G. Kable, Dublin, both of Ohio

[73] Assignee: Scriptel Corporation, Columbus, Ohio

[21] Appl. No.: 742,734

[22] Filed: Jun. 7, 1985

[51] Int. Cl.[4] ............................................. G08C 21/00
[52] U.S. Cl. ....................................... 178/18; 178/19
[58] Field of Search .............................. 178/18, 19, 20

[56] References Cited

U.S. PATENT DOCUMENTS

| 3,449,516 | 6/1969 | Cameron et al. | 178/19 |
| 3,591,718 | 7/1971 | Asano et al. | 178/19 |
| 4,435,616 | 3/1984 | Kley | 178/18 |
| 4,523,654 | 6/1985 | Quagle et al. | 178/19 |

Primary Examiner—Stafford D. Schreyer
Attorney, Agent, or Firm—Mueller and Smith

[57] ABSTRACT

An electrographic apparatus and system utilizing a resistive layer having an active area which operates in conjunction with a stylus or tracer or other suitable position locator. An a.c. source or alternatively a signal treatment means is connected to the resistive layer through rows of electrodes. Improved accuracy is achieved through the use of electrodes at the ends of the electrode rows and through the use of an enhanced conductivity region which also allows the boundary of the active area to be placed in close proximity to the electrodes.

8 Claims, 13 Drawing Figures

ELECTROGRAPHIC APPARATUS

BACKGROUND OF THE INVENTION

The generation of electrical signals representing the coordinates of locations on electrographic devices has been the subject of investigation and study for many years. Such devices are found in computer graphics, computer aided design and computer aided manufacturing systems. For such utilization, however, the digitizers or graphics tablets representing such devices are called upon to perform with a high degree of accuracy. Additionally, in some applications the size of these devices must be limited. As an example, a digitizer may be mounted upon the surface of a cathode ray tube which displays inputs from the device.

The operation of a digitizer or graphics tablet generally involves the same manual procedures as are employed in conventional graphics design, a stylus or tracer or other suitable position locator representing a writing instrument being drawn across or selectively positioned upon the tablet surface. In turn, the electrographic device responds to the position of the stylus to generate analog paired coordinate signals which are digitized and conveyed to a host computer facility.

For the most part, graphics tablets have been fashioned as composite structures wherein a grid formed of two spaced arrays of mutually orthogonally disposed fine wires is embedded in an insulative carrier. One surface of this structure serves to yieldably receive a stylus input which is converted to coordinate signals. Various methods have been evolved for generating coordinate defining signals, as a stylus-grid interaction, for example, a magnetostrictive effect may be established between stylus and grid or a capacitive coupling effect may be evoked between these components.

Graphics tablets utilizing composite structures, while providing accurate, linear output coordinate signals necessarily are expensive to fabricate and are prone to damage in the normal course of use. Further, for many applications, it is desirable that the tablet be fabricated as a highly transparent composite sheet. Grid formations within composite structures generally preclude such a transparency feature.

Early investigators have observed the advantage of developing graphics tablets having writing surfaces formed as a continuous resistive coating. An immediately recognized advantage for this approach to tablet design resides in the inherent simplicity of merely providing a resistive surface upon a supportive insulative substrate such as glass or plastic. Further, the substrates and associated resistive coatings may be transparent to permit an expanded range of industrial applications.

The history of the development of such resistive coating type devices shows that investigators have encountered a variety of technical problems, one of which being the non-uniform nature of the coordinate readouts achieved with the coatings. Generally, precise one-to-one correspondence or linearity is required between the actual stylus or tracer position and the resultant measured coordinate signals. Because the resistive coatings cannot be developed practically without local resistance variations, for example of about plus or minus ten percent, the nonlinear aspects of the otherwise promising design approach have impeded the development of practical devices until recently. However, certain important technical approaches to utilizing the resistive surfaces have been achieved. For example, Turner discloses a border treatment or switching technique in U.S. Pat. No. 3,699,439 entitled "Electrical-Probe Position Responsive Apparatus and Method" issued Oct. 17, 1972, assigned in common herewith. This approach utilizes a direct current form of input to the resistive surface from a hand-held stylus, the tip of which is physically applied to the resistive surface. Schlosser, et al. describes another improvement wherein an a.c. input signal is utilized in conjunction with the devices and signal treatment of the resulting coordinate pair output signal is considerably improved. See U.S. Pat. No. 4,456,787 entitled "Electrographic System and Method", issued June 26, 1984, also assigned in common herewith. Position responsive performance of the resistive layer devices further has been improved by a voltage wave form crossing approach and an arrangement wherein a.c. signals are applied to the resistive layer itself to be detected by a stylus or tracer as described in U.S. Pat. No. 4,055,726 by Turner, et al. entitled "Electrical Position Resolving by Zero-Crossing Delay" issued Oct. 25, 1977, and also assigned in common herewith. Kable describes still another improvement in position responsive performance wherein an a.c. input is utilized in conjunction with a solid state switching arrangement and a computer program. A description of this improvement may be found in U.S. Ser. No. 06/665,302, U.S. Pat. No. 4,600,807, entitled "Electrographic Apparatus" also assigned in common herewith. Still another improvement is disclosed in Nakamura, et al. U.S. Ser. No. 06/664,980, abandoned, entitled "Electrographic System and Method" and also assigned in common herewith. In this approach, position responsive performance is enhanced through utilization of a computer controlled interpolative error correction procedure.

As the designs of resistive layer digitizers now reach a level of technical development permitting their practical implementation in precision computer graphics, computer aided design and computer aided manufacturing systems, further need has been exhibited for their additional refinement with respect to improvements in linearity, i.e. with respect to the accuracy of their performance. Such improvements are most necessary at the edge regions and corner regions of the active or working area of the tablet where non-linearity has been most prominent. The approach to date for accommodating edge region phenomena which occurs adjacent electrodes placed at the edges of the resistive layer on the tablet has been to established a non-usable buffer region between the active area and the electrodes. Such a buffer region may have to be relatively wide, to obtain an acceptable level of accuracy within the active area of a graphics tablet. For applications having sufficient space the resistive layer in the tablet may be sized to provide the desired active area and the necessary buffer region. However, some applications cannot accommodate a wide buffer region. For example, in applications where a digitizer is applied to the surface of a display device such as a cathode ray tube (CRT), the digitizer may be required to fit within the boundaries of the CRT and the active area of the digitizer may have to be the same as the active area of the CRT display. In these applications the non-usable region of the digitizer can be no greater than the space between the active area and the outside edges of the CRT.

SUMMARY OF THE INVENTION

The present invention is addressed to an electrographic apparatus for generating coordinate data wherein coordinate positions upon the active area of a resistive layer are identified through the use of signals generated from an a.c. source. The a.c. source or alternately a signal treatment means is connected to the resistive layer through rows of electrodes. To improve the accuracy of the apparatus electrodes are placed at the ends of each of the electrode rows. In this regard, these electrodes may be single electrodes placed at each end of the electrode rows or corner electrodes placed at the intersection of adjacent rows of electrodes.

Further improvement in the accuracy of the apparatus is achieved by interposing an enhanced conductivity region between the active area and the electrodes of the device. Utilization of the enhanced conductivity region allows the boundary of the active area to be located in close proximity to the electrodes.

It is a further feature of the invention to provide an electrographic system comprising an electrically insulative substrate, a resistive layer supported upon said insulative substrate and having an active area extending in an x— coordinate direction between first and second spaced-apart edges and extending in a y coordinate direction between third and fourth spaced-apart edges. A first row of discrete spaced-apart electrodes is electrically coupled with said resistive layer intermediate said active area and said first edge and a second row of discrete, spaced-apart electrodes is electrically coupled with said resistive layer intermediate said active area and said second edge. Similarly, a third row of discrete, spaced apart electrodes is electrically coupled with said resistive layer intermediate said active area and said third edge and a fourth row of discrete, spaced-apart electrodes is electrically coupled with said resistive layer intermediate said active area and said fourth edge. A first corner electrode means is coupled with the resistive layer at the juncture of said first and third rows and a second corner electrode means is coupled with said resistive layer at the juncture of said first and fourth rows. Likewise, a third corner means is coupled with said resistive layer at the juncture of said second and third rows and a fourth corner electrode means is coupled with said resistive layer at the juncture of said second and fourth rows. The system further comprises a position locator adjacent said active area, a time varying excitation source of select frequency, a ground reference, and switching means. The switching means applies said ground reference to said first row of electrodes and to said first and second corner electrodes and simultaneously applies said source to said second row of electrodes and to said third and fourth corner electrodes and electrically isolates said third and fourth rows of electrodes during a first operational mode. During a second operational mode said switching means reverses said applications of said ground reference and said source to said first and second rows of electrodes and to said first, second, third, and fourth corner electrodes and maintains said electrical isolation of said third and fourth rows of electrodes. The switching means applies said ground reference to said third row of electrodes and to said first and third corner electrodes and simultaneously applies said source to said fourth row of electrodes and to said second and fourth corner electrodes and electrically isolates said first and second rows of electrodes during a third operational mode. Said switching means reverses said applications of said ground reference and said source to said third and fourth rows of electrodes and to said first, second, third, and fourth corner electrodes and maintains said electrical isolation of said first and second rows of electrodes during a fourth operational mode. Control means are provided for collecting a signal from said position collector.

Another feature of the invention is to provide an electrographic system comprising an electrically insulative substrate, a resistive layer supported upon said insulative substrate defining an active area extending in an x— coordinate sense between and inwardly of first and second spaced-apart edges and extending in a y— coordinate sense between and inwardly of third and fourth spaced-apart edges. A plurality of discrete, spaced-apart plus and minus electrodes is positioned intermediate said active area and said edges. These electrodes are coupled with said resistive layer. An enhanced conductivity region is intermediate said active area and said electrodes. The system further comprises a time varying excitation source of select frequency, a ground reference, and a plurality of solid-state series switches, each coupled with one said electrode and actuable to a closed condition in response to a select coordinate signal. The system further comprises a directional control switch means actuable in response to a plus control signal to connect said excitation source of select frequency with said switches coupled with said plus electrodes and said ground reference with said switches coupled with said minus electrodes and actuable in response to a minus control signal to connect said excitation source with said switches coupled with said minus electrodes and said ground reference with aid switches coupled with said plus electrodes and a control means coupled with said switches and said directional control switch means for simultaneously providing a select said coordinate logic signal and a select said control signal to derive positional data modes.

The instant invention also provides an improved graphics tablet for an electrographic system comprising an electrically insulative substrate and a resistive layer supported upon said insulative substrate and having an active area extending in an x— coordinate direction between first and second spaced-apart edges and extending in a y— coordinate direction between third and fourth spaced-apart edges. A first row of discrete, spaced-apart electrodes are electrically coupled with said resistive layer intermediate said active area and said first edge and a second row of discrete spaced-apart electrodes are electrically coupled with said resistive layer intermediate said active area and said second edge. Similarly, a third row of discrete spaced-apart electrodes are electrically coupled with said resistive layer intermediate said active area and said third edge and a fourth row of discrete, spaced-apart electrodes are electrically coupled with said resistive layer intermediate said active area and said fourth edge. First corner electrode means are coupled with the resistive layer at the juncture of said first and third rows and second corner electrodes means are coupled with said resistive layer at the juncture of said first and fourth rows. Likewise, third corner electrode means are coupled with said resistive layer at the juncture of said second and third rows and fourth corner electrode means are coupled with said resistive layer at the juncture of said second and fourth rows. An enhanced conductivity region is provided intermediate said active area and said electrodes.

Other features of the invention will, in part, be obvious and will, in part, appear hereinafter.

The invention, accordingly, comprises the apparatus and system possessing the construction, combination of elements and arrangement of parts which are exemplified in the following detailed description.

For a fuller understanding of the nature and features of the invention, reference should be had to the following detailed description taken in conjunction with the accompanying drawings.

DETAILED DESCRIPTION

In the discourse to follow, an electrographic device is described wherein the resistive surface of a digitizer or graphics tablet is excited by an a.c. source as opposed to the application of such source through a stylus or tracer or other suitable position locator. However, it should be understood that, with the exception of the selection of excitation frequencies, the same structure and circuit as is described herein may be utilized with the latter configuration.

Figure 1:
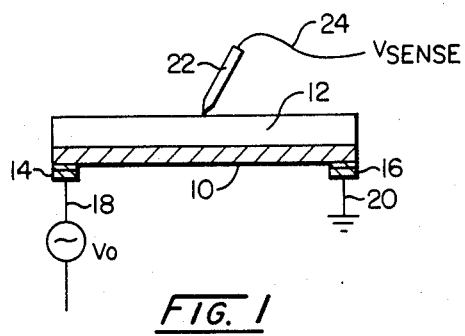
FIG. 1 is a schematic representation of a one-dimensional model of an electrographic apparatus.
Figure 2:
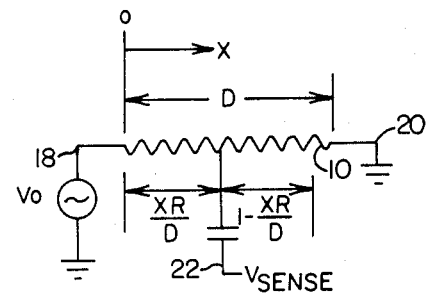
FIG. 2 is a schematic equivalent circuit model of FIG. 1.
Figure 3:
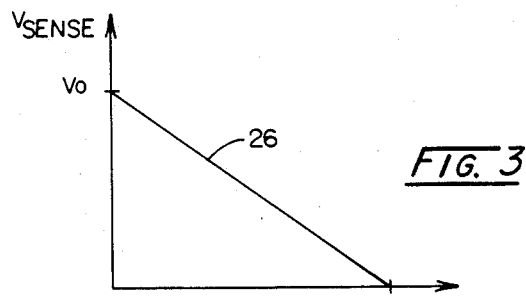
FIG. 3 is a schematic idealized curve showing voltage distribution across one axis of the resistive layer represented in FIG. 1.

As a preliminary consideration of the instant apparatus, reference is made to FIGS. 1 through 3 wherein an idealized, one-dimensional model of the graphics tablet is revealed. In FIG. 1, a resistive surface or sheet, for example, formed of a layer of indium-tin-oxide is represented at 10. This surface has been deposited onto a dielectric material such as glass represented at 12. Electrodes are shown coupled to the resistive layer 10 at 14 and 16. Electrode 14 is coupled with an a.c. source designated $V_0$ from line 18, while electrode 16 is coupled to ground through line 20. A pickup 22 which may be a stylus, tracer, or other suitable position locator is positioned on material 12 adjacent resistive layer 10 at any given location and through capacitive coupling serves to pickup a voltage output at line 24, such voltage being labled "$V_{sense}$". The equivalent circuit for this idealized one-dimensional model is represented in FIG. 2 where the resistive layer 10 is shown as a resistor and the distance of the stylus 22 from the edge of the resistor closest to the source $V_0$ is represented as "X" and the distance between electrodes 14 an 16 is represented as "D". The fraction of resistance "R" of layer 10 extending from the source of voltage excitation to the stylus at location X, may be represented by XR/D, while the distance from the location of the stylus 22 to the opposite electrode 16 may be represented as the labeled $(1-X/D)R$. The corresponding idealized value for $V_{sense}$ is shown in FIG. 3 as being linear, as represented by line 26. For various reasons, some of which will be discussed hereinafter such linearity is not readily achieved. To derive signals representing coordinate pairs representing the position of stylus 22 on the resistive layer 10, measurements of the voltage $V_{sense}$ are made along orthogonally disposed axes designated x and y. Through the utilization of switching, the application of the voltage source as through line 18 and the connection of ground as through line 20 as shown in FIG. 1 are alternately reversed for each of the x and y coordinates. With the values thus obtained for each designated x and y coordinate, a difference/sum voltage ratio is determined to obtain a coordinate position signal.

Figure 4:
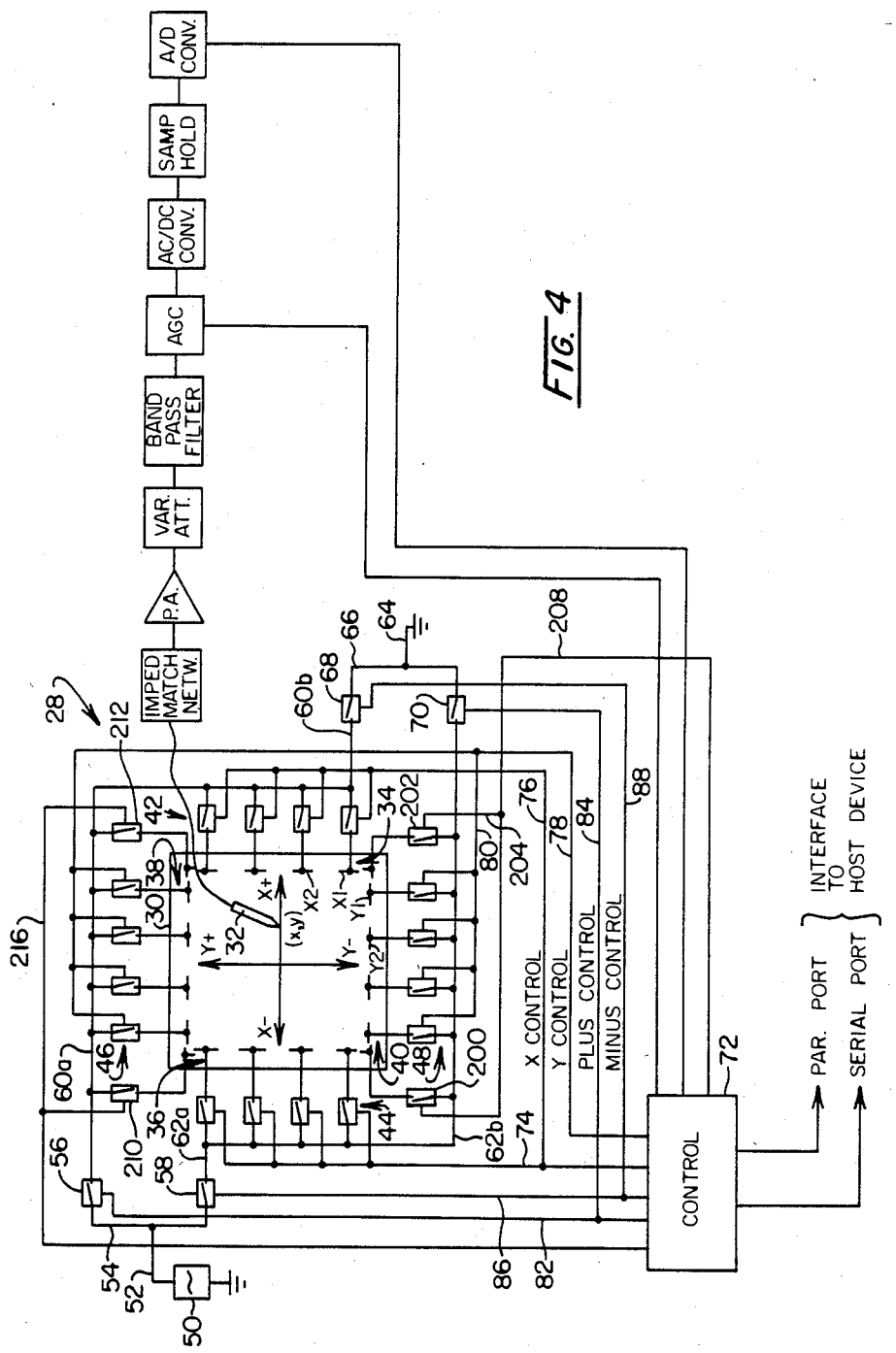
FIG. 4 is a schematic representation showing the circuit and switching components of an electrographic apparatus.

Referring to FIG. 4, an electrographic apparatus is shown generally in schematic fashion at 28. Apparatus 28 incorporates a switching device for carrying out the difference/sum ratio coordinate determining technique. In the figure, a resistive layer is shown at 30 having a rectangular shape and accessed by a position locator present as a stylus or tracer 32 at some point (x,y). The resistive layer 30 is shown having designated x+ and x− axes as well as y+ and y− axes, the intersection therebetween being essentially at the center of the rectangularly configured sheet 30.

Designating the coordinate system shown to range from +1 to −1 in both the x and y directions, a signal representing any given coordinate (x, y) pair can be determined by measuring the voltage value picked up by stylus 32 under a procedure where the alternating current source or time varying excitation source initially is applied to one edge of the resistive layer 30 in one coordinate direction while ground reference to applied to the oppositely disposed edge. This procedure then is reversed for the first coordinate direction and the combined readings may be used to determine one coordinate. The procedure then is carried out in the opposite coordinate sense. During the data collection procedure, one set of coordinate border regions or edges of the resistive layer 30, for example, the y+ and y− border regions are permitted to "float" in electrical isolation while the oppositely disposed or, for example, the x+ and x− coordinate border regions are operated upon by alternately applying ground and the a.c. source thereto. Permitting the set of nonoperating coordinate border regions to float enables the voltage gradients perpendicular to these regions to become substantially linear at the border regions. If the inactive border regions were held to a set potential the voltage gradients adjacent these regions would be distorted.

Application of the difference/sum voltage ratio to derive paired coordinate signals may be seen from the following example. In this example, the output of stylus 32 will be arbitrarily designate XPLUS when an a.c. current source is applied along the x+ coordinate border region of sheet 30 while simultaneously ground is applied to the opposite x− border region and the stylus output will be arbitrarily designated XMINUS when the opposite condition obtains wherein the a.c. source is applied along the x− coordinate border region of sheet 30 while simultaneously ground is applied to the oppositely disposed x+ region. Similarly, YPLUS will be the arbitrarily designated output of stylus 32 when the a.c. source is applied to resistive layer 30 at the y+ border region and ground is applied to the opposite y− region and the output signal at stylus 32 will be designated YMINUS when the a.c. current source is applied to the y− border region of resistive layer 30 and ground is applied to the opposite y+ region. Utilizing the aforementioned difference/sum voltage ratio in conjunction with the designated signal values, paired coordinate signals for any position of the stylus 32 on surface may be derived as follows:

$$\text{Position } x = \frac{(XPLUS) - (XMINUS)}{(XPLUS) + (XMINUS)}$$

$$\text{Position } y = \frac{(YPLUS) - (YMINUS)}{(YPLUS) + (YMINUS)}$$

The imposition of the a.c. signals as well as application of the ground couplings to the resistive layer 30 are carried out through contacts or electrodes provided as elongate pads positioned in rows in the border regions. Conventionally such electrodes are spaced equal distance from each other and from the ends of the rows and have a length approximately equal to the distance they are spaced-apart. FIG. 4 shows an array of four such electrodes along the x+ border region at 34, while an oppositely disposed array of such electrodes for the x− region is represented at 36. Correspondingly, an array of four spaced-apart electrodes along the y+ designated border region is shown at 38 while an oppositely positioned array of electrodes along the region designated y− is shown at 40.

Figure 5:
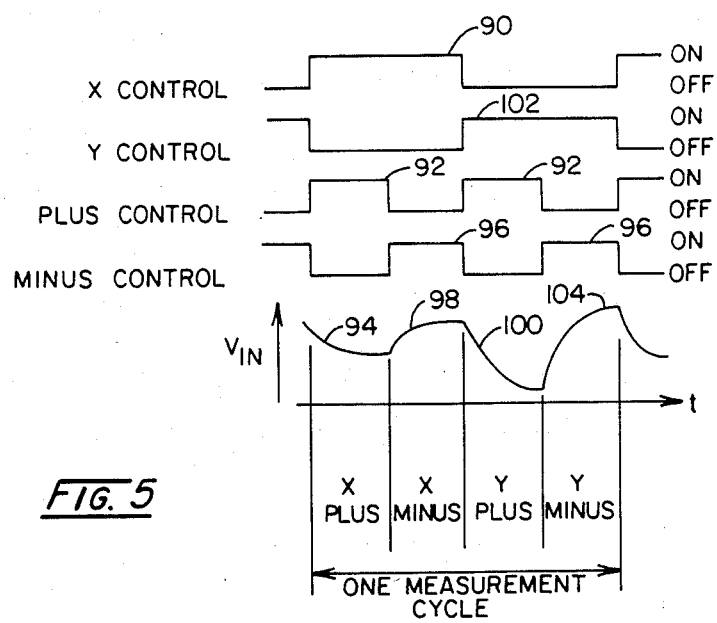
FIG. 5 is a schematic representation of timing diagrams and control sequence curves for sequential operational or data modes of the apparatus of FIG. 4.

Each of the electrodes within the array 34 thereof at the x+ border region is connected to one side of a single-pull, single-throw analog switch of an array thereof shown at 42. Similarly, each electrode of the array 36 at the x− region is connected to a corresponding single-pull, single-throw analog switch of an array thereof shown generally at 44. Correspondingly, each electrode within the array 38 at the y+ border region is connected to a corresponding single-pull, single-throw analog switch of an array thereof shown generally at 46, while the oppositely disposed y− border region electrodes of array 40 are each coupled to a corresponding single-pull, single-throw analog switch of an array 48 thereof. An a.c. source for exciting the resistive layer 30 is represented at 50 having an output at line 52 extending through line 54 to the inputs of two single-pull, single-throw analog switches 56 and 58. The output side of switch 56 is coupled to a bus 60a which, in turn, extends in common to the inputs of each analog switch within arrays 46 and 42. Correspondingly, the output of switch 58 extends via bus components 62a and 62b to the common inputs of the analog switches within arrays 44 and 48. A ground which must be established for operating the electrographic apparatus 28 incorporating the resistive layer 30 is derived from line 64 which extends through line 66 to the inputs of two single-pull, single-throw analog switches 68 and 70. The output of switch 68 is coupled to bus component 60b leading through bus 60a in common to the inputs of the analog switches within arrays 42 and 46. Similarly, the output of analog switch 70 is coupled to bus component 62b which is connected in common to the inputs of the analog switches within arrays 44 and 48. All of the above-described analog switches are actuated by logic compatible voltage signals developed at the output of a central control including a microprocessor as represented at block 72. Thus, by appropriate signal actuation through lines 74 and 76 labeled "X Control" (first coordinate logic signal), all of the signals along the x axis as represented at arrays 42 and 44 may be closed or opened simultaneously. In similar fashion, the control 72 may assert an actuating signal along lines 78 and 80, labeled "Y Control" (second coordinate logic signal), to simultaneously open or close all of the switches along the y axis as represented at arrays 46 and 48. Control 72 also may assert simultaneous actuating and deactuating signals from along lines 82 and 84, labeled "Plus Control" (first directional logic signal) to switches 56 and 70. By such actuation, the a.c. source may be applied to bus 60a and thence to the inputs of the y+ switch array 46 and to the inputs of the x+ switch array 42 while the oppositely disposed y− switch array 48 and x− switch array 44 may be coupled to ground simultaneously through bus 62b. In a similar fashion, the control 72 may assert an actuating signal along lines 86 and 88 labeled "Minus Control" (second directional logic signal) to effect the actuation of switches 58 and 68 and passage of signals from a.c. source 50 through buses 62a and 62b to the inputs of the x− switch array 44 and the y− switch array 48, while, simultaneously, connecting the inputs of the y+ switch array 46 and the x+ switch array 42 with ground through bus 60b. By sequentially actuating the "X Control" and "Y Control" and alternating the "Plus Control" and the "Minus Control" during the time the x and y controls are actuated, the a.c. source will be applied sequentially first to the switch arrays 42 and 44 in the x coordinate direction and subsequently to the switch arrays 46 and 48 in the y coordinate direction. In this regard, reference is made to FIG. 5 wherein the modes of operation for carrying out one coordinate measurement cycle are illustrated in timing diagram form. Thus, it may be observed that x control lines 74 and 76 provide an "on" or actuating signal represented at 90 simultaneously with a corresponding "on" signal at plus control lines 82 and 84 as represented at 92 to develop to an XPLUS signal as represented at curve 94 during a first quarter interval of one measurement cycle. Similarly, an "on" condition for the x control signal as represented at 90 generated in combination with a corresponding "on" actuating signal at minus control lines 86 and 88 as represented at 96 causes an XMINUS signal to be developed. This signal is represented at curve 98 and represents the second quarter of the measurment cycle. The third quarter of the measurement cycle is shown developing the YPLUS signal shown at curve 100 by the assumption of an "on" or actuating status of the y control lines 78 and 80 as represented at 102. Simultaneously, with this "on" status as represented at 102, the plus control lines 82 and 84 carry an actuating signal as represented by the "on" status shown at 92. Finally, the YMINUS signal 104 is developed for the fourth quarter of the measurement cycle with the assertion of an "on" status at the y control lines 78 and 80 as represented at 102 in combination with a corresponding "on" condition at the minus control lines 86 and 88 as represented at 96. With the arrangement thus depicted, the a.c. source 50 is applied first to one border region and then to the opposite region in the x coordinate direction. Subsequently, the same arrangement is provided for the y coordinate direction. The switches in the border regions of the coordinate direction not being operated remain open to permit that pair of border regions to "float" in electrical isolation and thereby reduce distortion of voltage gradients in those regions.

Utilizing the coordinate determining procedure described in conjunction with FIG. 4 the measured position of the stylus 32 (signal domain) on the resistive layer 30 would correspond substantially with the actual position of the stylus 32 (physical domain) if the voltage gradients (change of voltage per unit of distance) across the resistive layer 30 were uniform. It has been found that for the graphics tablet configured as shown in FIG. 4 the voltage gradients are substantially uniform in the central region of the resistive layer 30. Whatever non-linearity of the voltage gradients that exists within that region can be accommodated through the imposition of an error correction procedure which employs an algorithm. With this procedure a relatively high degree of accuracy or correspondence between the measured position and the physical position of the stylus 32 may be obtained. However, a significant degree of voltage gradient distortion occurs at the border regions and corner regions of the electrographic apparatus 28. This distortion reduces the accuracy of the device and requires the algorithm in the error correction technique to be more complex which reduces the computational speed of the device. For those applications where the active or usable area of the resistive layer 30 on the device can be spaced a relatively large distance from the electrodes in the border regions and the corners of the border region, voltage gradient distortion in these regions does not present a serious problem. A buffer region or zone having sufficient width to provide an active area with a minimal amount of voltage gradient distortion can be interposed between the electrodes and the active area. However, for those applications of a graphics tablet which require that the active area extend closely to the outer edge of the device the imposition of a relatively wide buffer region to avoid the effects of voltage gradient distortion in the active area becomes unacceptable.

Figure 6:
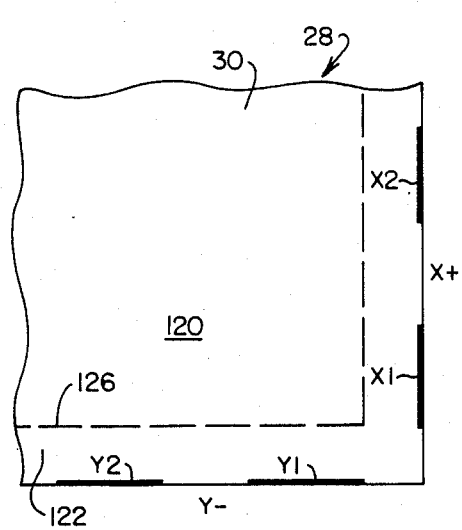
FIG. 6 is an enlarged schematic representation of the lower right quadrant of a traditional graphics tablet as depicted in FIG. 4 which does not employ the improvements of the instant invention.
Figure 7:
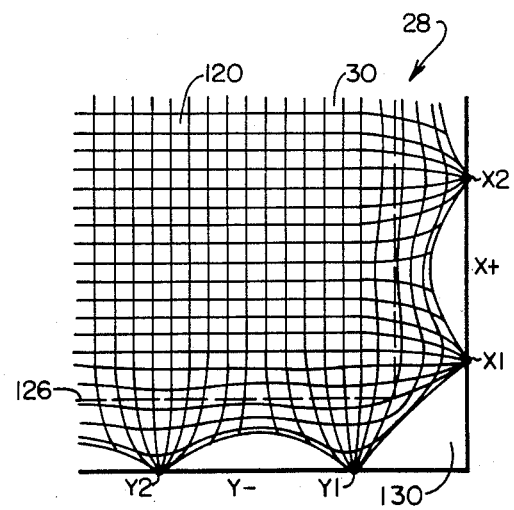
FIG. 7 is a representation generated using a computer model of the voltage gradients on both axes across the entire physical area of the graphics tablet quadrant depicted in FIG. 6.
Figure 8:
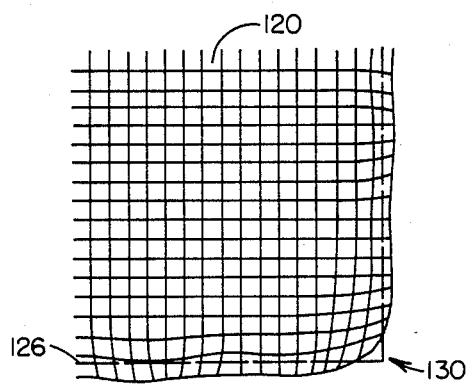
FIG. 8 is a view similar to FIG. 7 of the voltage gradients on both axes across the active area shown bounded by a dashed line in FIGS. 6 and 7.

The distortion or non-uniformity of the voltage gradients in the corner and border regions of the electrographic device or graphics tablet 28 depicted in FIG. 4 may be seen by referring to FIGS. 6–8. Looking to FIG. 6 which is an enlarged schematic representation of the lower right quadrant of graphics tablet 28, it may be observed that the quadrant includes two electrodes x1 and x2 in the x+ electrode array 34 at the x+ border region and two electrodes y1 and y2 in the y− electrode array 40 at the y− border region. These electrodes have been identified by the same alphanumeric designations in FIG. 4. Returning to FIG. 6 an active area bounded by line 126 is shown on resistive layer 30 at 120. A relatively wide buffer zone or region 122 defined on layer 30 surrounds active area 120 and spaces its from the electrodes x1, x2, y1, and y2.

A plot of the voltage gradients across one quadrant of the graphics tablet configured as described in connection with FIG. 4 and represented in FIG. 6 which has been generated by a computer model may be seen in FIG. 7. It should be noted that a plot of the actual measurements of voltage gradients across both axes of the graphics tablet configured as described in connection with FIG. 4 corresponds with the plot derived from the computer model. It should also be noted that the voltage gradients illustrated in FIG. 7 for one quadrant of a graphics tablet are representative of these gradients at corresponding locations in the other quadrants of the tablet.

Each of the solid horizontal and vertical lines shown on the grid in FIG. 7 represents the voltage along a line parallel to an edge of the tablet. If the voltage gradients across the resistive sheet 30 of graphics tablet 28 were uniform or distortion free each of these lines would be straight and would be parallel to the other lines extending in the same direction. Additionally, the distance between each of the lines would be equal. It is apparent that the voltages on resistive layer 30 undergo severe distortion in the x+ and y− border regions around and between the electrodes x1, x2, y1, and y2 and at the corner region 130. Additionally, in the corner region 130 between electrodes x1 and y1 the voltage lines tend to merge. This means that different locations in the corner region 130 of tablet 28 will have the same or nearly the same voltage value. As is apparent discrete voltage values on the surface of resistive layer 30 are required to achieve an effective readout of the coordinates of the location on tablet 28.

As previously mentioned, a non-usable buffer region may be arbitrarily designated between the electrodes in the border regions and an active area to provide an active area in which voltage gradient uniformity is adequate to generate readouts having a desired system accuracy by employing error correction techniques such as described in co-pending U.S. Ser. No. 06/664,980, noted hereinbefore. In a conventional graphics tablet it has been determined that a buffer region having a width of about 1.5 inches is necessary to obtain the required accuracy of the system. Turning to FIG. 8 which is a view similar to FIG. 7 but represents only those voltage gradient lines within the active area 120 bounded by line 126 and spaced approximately 1.5 inches from the electrodes x1, x2, y1, and y2, it may be observed that the voltage gradient lines within area 126 are relatively uniform. The greatest distortion of the voltage gradient lines for this area occurs in corner region 130. It has been found that voltage distortion in the corners of the active area limit the accuracy of a graphics tablet. Consequently, the accuracy of the tablet will be improved if the distortion of voltages in the corner regions can be reduced to where it is no greater than the distortion of voltages in the center portion of the active area.

Figure 9:
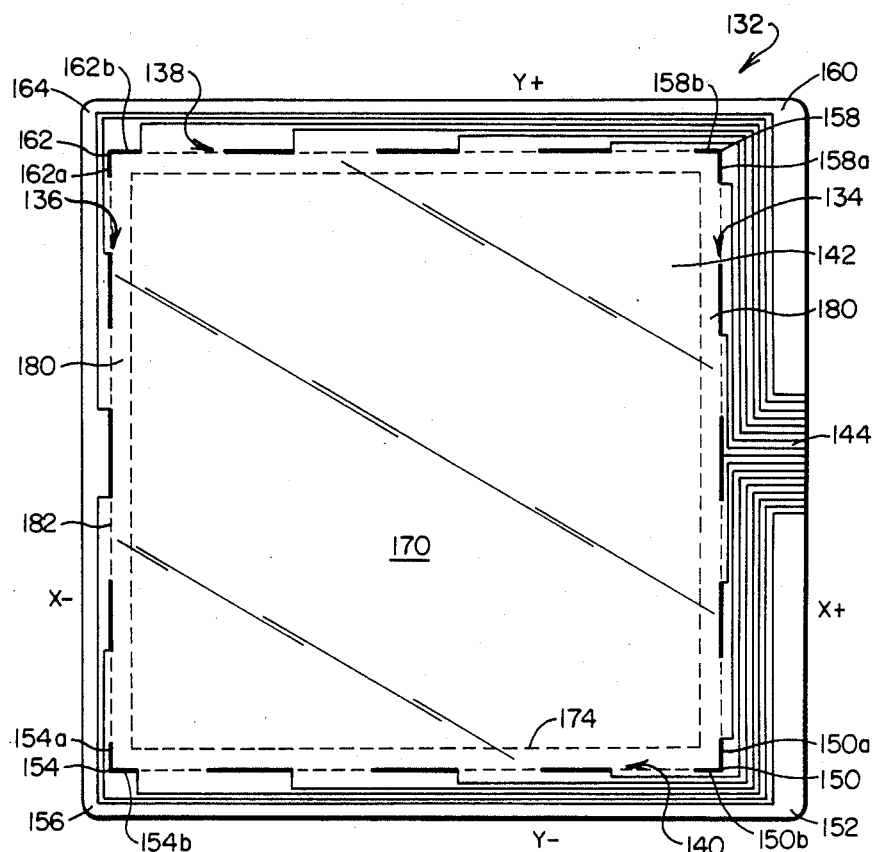
FIG. 9 is a plan view of a graphics tablet employing the corner electrodes and the enhanced conductivity region of the invention described in the instant application.

It has been determined that the more severe distortion of the voltage gradients in the corner regions of a graphics tablet can be reduced to an important extent by placing an electrode at the end of each of the rows of electrodes in the border regions. Referring to FIG. 9, a graphics tablet 132 having a resistive layer 142 is depicted in which rows of electrodes 134, 136, 138 and 140 are located in the respective x+, x−, y+ and y− border regions. Layer 142 is formed by a process wherein an indium-tin-oxide (ITO) layer is formed upon a dielectric supporting substrate, for example glass. The outer border region of the composite of glass and ITO then is etched to provide an ITO region having a rectangular peripheral extent larger than the anticipated active area by about 0.5 inches. This leaves a glass region suited for supporting printed circuit leads represented by an array 144. These leads may be silk screened over the glass portion using, for example, a silver ink. Note that one each of the leads extends to the electrodes within the ITO region.

An electrode 150 is positioned in the lower right corner 152 of tablet 132 at the intersection of electrode row 134 in the x+ border region and electrode row 140 in the y− border region. Similarly, an electrode 154 is located in the lower left corner 156 of tablet 132 at the intersection of electrode rows 140 and 136 in the respective y− and x− border regions. Likewise, an electrode 158 is positioned at the upper right corner 160 of tablet 132 at the intersection of the row of electrodes 134 in the x+ border region and the row of electrodes 138 in the y+ border region and an electrode 162 is located in the upper left corner 164 of tablet 132 at the intersection of the electrode rows 136 and 138 in the respective y− and y+ border regions. Each of the corner electrodes 150, 154, 158, and 162 has a pair of perpendicular legs which are joined together, which are of equal length and which extend into adjacent rows of electrodes. For example, one leg 150a of electrode 150 extends into electrode row 134 while the other leg 150b extends into electrode row 140. Similarly, electrode 154 has one leg 154a which extends into electrode row 136 and another leg 154b which extends into electrode row 140. Likewise, one leg 158a of electrode 158 extends into electrode row 134 and the other leg 158b extends into electrode row 138. Additionally, electrode 162 has one leg 162b which extends into electrode row 138 and a second leg 162a which extends into electrode row 136.

In connection with the description of the operation of electrographic apparatus 28 shown in FIG. 4 it may be recalled that when the pairs of electrodes in one of the x or y border regions were activated the opposite pair of electrodes were allowed to float in electrical isolation. The description of operation of electrographic apparatus 28 also applies to the operation of graphics tablet 132 with one exception. Because the corner electrodes 150, 154, 158, and 162 extend into adjacent x and y border regions these electrodes are not permitted to float. One of the two electrode rows into which the legs of the corner electrodes extend is always active and these electrodes must assume the state of the active or "on" electrode row. Consequently, corner electrodes 150, 154, 158, and 162 will always have either an a.c. source, signal treatment means or a ground reference applied to them. For this reason, the corner electrodes 150, 154, 158, and 162 must be connected to switches which are operated by a control represented at 72 in FIG. 4 independently of the operation of any of the rows of electrodes 134, 136, 138, and 140. Because the corner electrodes do not float it has been found desirable to make the legs of these electrodes shorter than the length of other electrodes in the rows. For instance, if each leg of a corner electrode 150. 154, 158, and 162 is three units long, it is preferred to have the remaining electrodes in the rows 134, 136, 138, and 140 six units long. Further, it is preferred to have each of the electrodes in a row including the corner electrodes spaced between five and six units apart. Returning to FIG. 4, the corner electrodes within the y− region 40 are shown addressed by switches 200 and 202 which are controlled via lines 204 and 208 from control function 72. The switches 200 and 202 are seen coupled with line 62b for appropriate assertion of ground or a.c. source. In similar fashion, the corner electrodes within the y+ region 38 are controlled from switches 210 and 212 which, in turn, are controlled via lines 214 and 216 from control function 72. Switches 210 and 212 are, in turn, connected to line 60a for assertion of appropriate ground or source through them to the corner electrodes.

Figure 10:
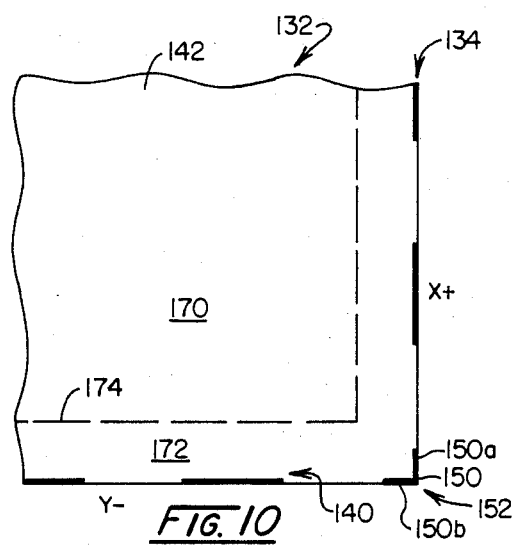
FIG. 10 is a schematic representation of the lower right quadrant of the graphics tablet illustrated in FIG. 9 showing only the corner electrodes of the instant invention.
Figure 11:
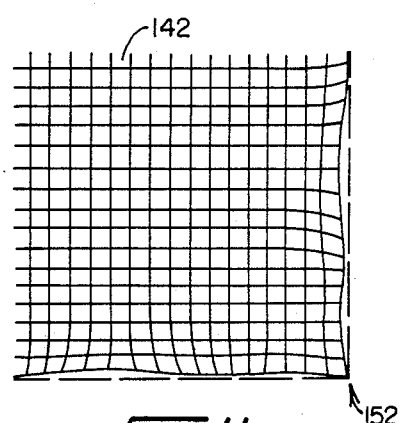
FIG. 11 is a representation derived from a computer model of the voltage gradients on both axes of the active area of the graphics tablet quadrant illustrated in FIG. 10.

A schematic representation of the lower right quadrant of the graphics tablet 132 of the instant invention may be seen in FIG. 10. In this diagram, a region 172 has been designated as a buffer region between an active area 170 having a boundary 174 shown in dashed lines, and the rows of electrodes 134 and 140. For comparison purposes, the width of buffer region 172 has been made equal to the width of buffer region 122 described in connections with FIGS. 6–8. A computer model of the voltage gradients across both axes of the active area 170 of tablet 132 may be seen in FIG. 11. It should be observed that with the addition of electrodes at the ends of the electrode rows the level of voltage gradient distortion in the corner region of 152 has been reduced to where that distortion is no greater than the distortion of voltage gradients in the central portion of the resistive layer 142. When the plot of the voltage gradients in the active area 170 of the graphics tablet 132 of the instant invention as shown in FIG. 11 is compared with a similar plot of the active area 120 of the conventional tablet 28 which does not employ corner electrodes as shown in FIG. 8, it may be seen that these electrodes significantly reduce the level of distortion of voltage gradients in the corner regions.

Although the electrodes 150, 154, 158, and 162 at the ends of the electrode rows 134, 136, 138, and 140 are illustrated as having pairs of joined prependicular legs, which extend into adjacent rows of electrodes, the advantages accruing from placing electrodes at the ends of the rows may be obtained from an alternate configuraton of the electrodes. For example, the perpendicular legs of the corner electrodes 150, 154, 158, and 162 could be detached and spaced a short distance from each other. Consequently, in the second or alternate configuration of electrodes, there is a single electrode at each end of the electrode rows 134, 136, 138 and 140 and the electrodes at the ends of one row do not engage the electrodes at the ends of an adjacent row. In the second configuration the electrodes at each end of the rows assume the same state as the other electrodes in the row. Consequently, the electrodes at the ends of the rows assume a floating state as well as an operating state. It has been found preferable to provide the L-shaped corner electrodes described in connection with FIGS. 9 and 10 because fewer leads and fewer switches are required for this configuration.

In those applications where the active area of the graphic tablets must extend closely to the outer edge of the device, such as where the resistive layer is applied to the surface of a CRT, the conventional practice of having a relatively wide, non-usable buffer region on the surface of the resistive layer between the electrodes and the active area is unacceptable. It has been discovered that the active area of a graphics tablet may be positioned in close proximity with the rows of electrodes in the border regions and also have a voltage gradient uniformity sufficient to generate positional readouts of a desired system accuracy by carrying out a controlled alteration of the resistivity of the material in the region between the electrodes and the active area. Looking again to FIG. 9, the active area boundary 174 of graphics tablet 132 is shown separated from the electrode rows 134, 136, 138, and 140 by a very narrow enhanced conductivity zone or region 180. In conventional graphics tablets the bulk resistivity, i.e. the resistance per square unit of the resistive layer is uniform throughout the entire surface of the tablet. However, in the graphics tablet 132 of the instant invention the bulk resistivity of that portion of resistive layer 142 which is designated the active area 170 is different from the bulk resistivity of that portion of resistive layer 142 which is designated the enhanced conductivity region 180.

In tablet 132, active area 170 has a bulk resistivity of approximately 600 ohms per square, i.e., any square unit of active area 170 such as one inch by one inch has a resistance of 600 ohms. In contrast thereto, the enhanced conductivity region 180 has a bulk resistivity of approximately 60 ohms per square, i.e., the resistance of region 180 is one tenth the resistance of active area 170. Stated another way the conductivity of region 180 is ten times greater than the conductivity of active area 170. It has been found that the voltage gradients at the boundary 174 of active area become more uniform as the conductivity of enhanced conductivity region 180 is increased. Thus, the active area 170 may be moved closer to the rows of electrodes 134, 136, 138, and 140 and the voltage gradients at the boundary 174 can be made sufficiently uniform to enable a desired system accuracy to be obtained by increasing the conductivity of region 180. It appears that if the width of the conductivity region 180 is changed by the same percentage and in inverse proportion to the change in conductivity of the conductivity region 180 of the active area, the voltage gradients at the boundary 174 of the active area 170 remain unchanged. In graphics tablet 132 the conductivity region 180 has a width of approximately 0.2 inches.

Figure 12:
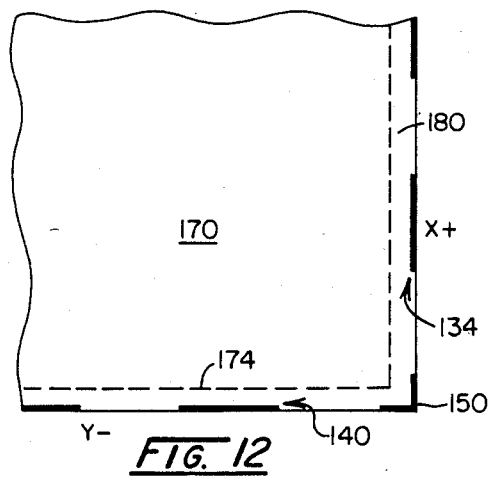
FIG. 12 is a schematic representation of the lower right quadrant of the graphics tablet shown in FIG. 9 depicting both the corner electrodes and the enhanced conductivity region of the instant invention.
Figure 13:
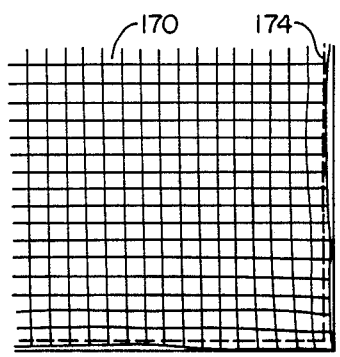
FIG. 13 is a representation generated utilizing a computer model of the voltage gradients on both axes of the entire physical area of the graphics tablet quadrant pictured in FIG. 12.

The effect of increasing the conductivity of region 180 by a factor of ten on voltage gradient uniformity at the boundary 174 of active area 170 may be seen by referring to FIGS. 12 and 13. FIG. 12 is a schematic representation of the lower right quadrant of graphics tablet 132 and FIG. 13 is a representation derived from a computer model of the voltage gradients on both axes of the entire physical area of the quadrant pictured in FIG. 12. From FIG. 13 it is apparent that the voltage gradients at the boundary 174 of active area 170 are remarkably uniform especially when it is recalled that boundary 174 is spaced approximately 0.2 inches from the rows of electrodes 134 and 140. When FIG. 13 is compared with FIG. 8 which illustrates the voltage gradients along the boundary 126 of an active area 120 spaced approximately 1.5 inches from the rows of electrodes in a conventional tablet it may be seen that the enhanced conductivity region has permitted the active area to be placed in close proximity to the rows of electrodes and substantially increased the uniformity of the voltage gradients at the boundary of the active area. In fact, the uniformity of the voltage gradients at boundary 174 of active area 170 has become substantially equivalent to the uniformity of the voltage gradients in the center of active area 170.

It seems reasonable to assume it would be desirable to further increase the conductivity of the conductivity region. However, the advantages otherwise accruing tend to lessen when the conductivity of the enhanced conductivity region becomes greater than about ten times that of the active area. It has been learned that as the conductivity of this region increases, the power consumption of the graphics tablet also increases. It is theorized that the buffer region of a conventional graphics tablet can be considered as comprised of a large number of discrete resistors. Such a region having a certain width would have a given amount of inter electrode resistance. As the region becomes wider, the amount of inter electrode resistance becomes less, somewhat similar to adding resistors in parallel. By analogy lowering the bulk resistivity or increasing the conductivity of the enhanced conductivity region also reduces the inter electrode resistance and has the same effect as making the buffer region of a conventional tablet wider. Of course, if an infinite number of resistors are added in parallel to a circuit the resistance becomes very small and a short circuit condition results. Similarly, if the bulk resistivity of the conductivity region is made too low, power consumption becomes excessive and ultimately a short circuit will occur. Thus, logical design tradeoffs will occur to the investigator.

In graphics tablet 132 the conductivity of region 180 was increased by depositing a greater amount of indium-tin-oxide on the resistive layer 142. Consequently, the enhanced conductivity region was formed from the same material as the resistive layer of the active area. Of course, the conductivity region could be manufactured from a different material than that of the resistive layer for the active area.

From the above it may be seen that graphics tablets having increased accuracy and having a diminished distance between the electrodes in the active areas but exhibiting most acceptable voltage gradient uniformities may be achieved in accordance with the teachings of the instant invention.

Since certain changes may be made to the above-described apparatus without departing from the scope of the invention herein, it is intended that all mattercontained in the description thereof or shown in the accompanying drawings shall be interpreted as illustrative and not in a limiting sense.

We claim:

1. An electrographic system comprising:
    an electrically insulative substrate;
    a resistive layer supported upon said insulative substrate and having an active area extending in an x— coordinate direction between first and second spaced apart edges and extending in a y— coordinate direction between third and fourth spaced-apart edges;
    a first row of discrete, spaced-apart electrodes electrically coupled with said resistive layer intermediate said active area and said first edge;
    a second row of discrete, spaced-apart electrodes electrically coupled with said resistive layer intermediate said active area and said second edge;

a third row of discrete, spaced-apart electrodes electrically coupled with said resistive layer intermediate said active area and said third edge;

a fourth row of discrete, spaced-apart electrodes electrically coupled with said resistive layer intermediate said active area and said fourth edge;

first corner electrode means coupled with said resistive layer at the juncture of said first and third rows;

second corner electrode means coupled with said resistive layer at the juncture of said first and fourth rows;

third corner electrode means coupled with said resistive layer at the juncture of said second and third rows;

fourth corner electrode means coupled with said resistive layer at the juncture of said second and fourth rows;

a position locator adjacent said active area;

a time varying excitation source of select frequency;

a ground reference;

switching means for applying said ground reference to said first row of electrodes and to said first and second corner electrodes and simultaneously applying said source to said second row of electrodes and to said third and fourth corner electrodes and electrically isolating said third and fourth rows of electrodes during a first operational mode, for reversing said applications of said ground reference and said source to said first and second rows of electrodes and to said first, second, third, and fourth corner electrodes and maintaining said electrical isolation of said third and fourth rows of electrodes during a second operational mode, for applying said ground reference to said third row of electrodes and to said first and third corner electrodes and simultaneously applying said source to said fourth row of electrodes and to said second and fourth corner electrodes and electrically isolating said first and second rows of electrodes during a third operational mode, and for reversing said applications of said ground reference and said source of said third and fourth rows of electrodes and to said first, second, third and fourth corner electrodes and maintaining said electrical isolation of said first and second rows of electrodes during a fourth operational mode; and control means for collecting a signal from said position locator.

2. An electrographic system comprising:

an electrically insulative substrate;

a resistive layer supported upon said insulative substrate and having an active area extending in an x— coordinate direction between first and second spaced apart edges and extending in a y— coordinate direction between third and fourth spaced-apart edges;

a first row of discrete, spaced-apart electrodes electrically coupled with said resistive layer intermediate said active area and said first edge;

a second row of discrete, spaced-apart electrodes electrically coupled with said resistive layer intermediate said active area and said second edge;

a third row of discrete, spaced-apart electrodes electrically coupled with said resistive layer intermediate said active area and said third edge;

a fourth row of discrete, spaced-apart electrodes electrically coupled with said resistive layer intermediate said active area and said fourth edge;

first corner electrode means coupled with said resistive layer at the juncture of said first and third rows;

second corner electrode means coupled with said resistive layer at the juncture of said first and fourth rows;

third corner electrode means coupled with said resistive layer at the juncture of said second and third rows;

fourth corner electrode means coupled with said resistive layer at the juncture of said second and fourth rows;

a time varying excitation source of select frequency;

a position locator adjacent said active area for inputting said source at a select position in said active area;

signal treatment means;

a ground reference;

switching means for applying said ground reference to said first row of electrodes and to said first and second corner electrodes and simultaneously applying said signal treatment means to said second row of electrodes and to said third and fourth corner electrodes and electrically isolating said third and fourth rows of electrodes during a first operational mode, for reversing said applications of said ground reference and said signal treatment means to said first and second rows of electrodes and to said first, second, third and fourth corner electrodes and maintaining said electrical isolation of said third and fourth rows of electrodes during a second operational mode, for applying said ground reference to said third row of electrodes and to said first and third corner electrodes and simultaneously applying said signal treatment means to said fourth row of electrodes and to said second and fourth corner electrodes and electrically isolating said first and second rows of electrodes during a third operational mode, and for reversing said applications of said ground reference and said signal treatment means to said third and fourth rows of electrodes and to said first, second, third and fourth corner electrodes and maintaining said electrical isolation of said first and second rows of electrodes during a fourth operational mode.

3. An electrographic system comprising:

an electrically insulative substrate;

a resistive layer supported upon said insulative substrate and having an active area extending in an x— coordinate direction between first and second spaced apart edges and extending in a y— coordinate direction between third and fourth spaced-apart edges said resistive layer being provided as a coating of indium-tin-oxide having a thickness selected for exhibiting a resistivity of about 600 ohms per square;

a first row of discrete, spaced-apart electrodes electrically coupled with said resistive layer intermediate said active area and said first edge;

a second row of discrete, spaced-apart electrodes electrically coupled with said resistive layer intermediate said active area and said second edge;

a third row of discrete, spaced-apart electrodes electrically coupled with said resistive layer intermediate said active area and said third edge;

a fourth row of discrete, spaced-apart electroes electrically coupled with said resistive layer intermediate said active area and said fourth edge;

one electrode in said first row of electrodes being positioned at the end of said first row adjacent said third row and another electrode in said first row being positioned at the opposite end of said first row adjacent said fourth row;

one electrode in said second row of electrodes being positioned at the end of said second row adjacent said third row and another electrode in said second row being positioned at the end of said second row adjacent said fourth row;

one electrode in said third row of electrodes being positioned at the end of said third row adjacent said first row and another electrode in said third row being positioned at the opposite end of said third row adjacent said second row;

one electrode in said fourth row of electrodes being positioned at the end of said fourth row adjacent said first row and another electrode in said fourth row being positioned at the opposite end of said fourth row adjacent said second row;

an enhanced conductivity region intermediate said active area and said electrodes, said region being formed of a layer of indium-tin-oxide supported by said substrate and having a thickness selected for exhibiting a resistivity of about 60 ohms per square;

a position locator adjacent said active area;

a time varying excitation source of select frequency;

a ground reference;

switching means for applying said ground reference to said first row of electrodes and simultaneously applying said source to said second row of electrodes and electrically isolating said third and fourth rows of electrodes during a first operational mode, for reversing said applications of said ground reference and said source to said first and second rows of electrodes and maintaining said electrical isolation of said third and fourth rows of electrodes during a second operational mode, for applying said ground reference to said third row of electrodes and simultaneously applying said source to said fourth row of electrodes and electrically isolating said first and second rows of electrodes during a third operational mode, and for reversing said applications of said ground reference and said source to said third and fourth rows of electrodes and maintaining said electrical isolation of said first and second rows of electrodes during a fourth opertional mode; and control means for collection a signal from said position locator.

4. An electrographic system comprising:

an electrically insulative substrate;

a resistive layer supported upon said insulative substrate and having an active area extending in an x— coordinate direction between first and second spaced apart edges and extending in a y— coordinate direction between third and fourth spaced-apart edges, said resistive layer being provided as a coating of indium-tin-oxide having a thickness selected for exhibiting a resistivity of about 600 ohms per square;

a first row of discrete, spaced-apart electrodes electrically coupled with said resistive layer intermediate said active area and said first edge;

a second row of discrete, spaced-apart electrodes electrically coupled with said resistive layer intermediate said active area and said second edge;

a third row of discrete, spaced-apart electrodes electrically coupled with said resistive layer intermediate said active area and said third edge;

a fourth row of discrete, spaced-apart electrodes electrically coupled with said resistive layer intermediate said active area and said fourth edge;

one electrode in said first row of electrodes being positioned at the end of said first row adjacent said third row and another electrode in said first row being positioned at the opposite end of said first row adjacent said fourth row;

one electrode in said second row of electrodes being positioned at the end of said second row adjacent said third row and another electrode in said second row being positioned at the end of said second row adjacent said fourth row;

one electrode in said third row of electrodes being positioned at the end of said third row adjacent said first row and another electrode in said third row being positioned at the opposite end of said third row adjacent said second row; and one electrode in said fourth row of electrodes being positioned at the end of said fourth row adjacent said first row and another electrode in said fourth row being positioned at the opposite end of said fourth row adjacent said second row;

a time varying excitation source of select frequency;

an enhanced conductivity region intermediate said active area and said electrodes, said region being formed of a layer of indium-tin-oxide supported by said substrate and having a thickness selected for exhibiting a resistivity of about 60 ohms per square;

a position locator adjacent said active area for inputting said source at a select location in said active area;

signal treatment means;

a ground reference; and switching means for applying said ground reference to said first row of electrodes and simultaneously applying said signal treatment means to said second row of electrodes and electrically isolating said third and fourth rows of electrodes during a first operational mode, for reversing said applications of said ground reference and said signal treatment means to said first and second rows of electrodes and maintaining said electrical isolation of said third and fourth rows of electrodes during a second operational mode, for applying said ground reference to said third row of electrodes and simultaneously applying said signal treatment means to said fourth row of electrodes and electrically isolating said first and second rows of electrodes during a third operational mode, and for reversing said applications of said ground reference and said signal treatment means to said third and fourth rows of electrodes and maintaining said electrical isolation of said first and second rows of electrode during a fourth operational mode.

5. An improved graphics tablet for an electrographic system comprising:

an electrically insulative substrate;

a resistive layer supported upon said insulative substrate and having an active area extending in an x— coordinate direction between first and second spaced apart edges and extending in a y— coordinate direction between third and fourth spaced-apart edges;

a first row of discrete, spaced-apart electrodes electrically coupled with said resistive layer intermediate said active area and said first edge;

a second row of discrete, spaced-apart electrodes electrically coupled with said resistive layer intermediate said active area and said second edge;

a third row of discrete, spaced-apart electrodes electrically coupled with said resistive layer intermediate said active area and said third edge;

a fourth row of discrete, spaced-apart electrodes electrically coupled with said resistive layer intermediate said active area and said fourth edge;

first corner electrode means coupled with said resistive layer at the juncture of said first and third rows;

second corner electrode means coupled with said resistive layer at the juncture of said first and fourth rows;

third corner electrode means coupled with said resistive layer at the juncture of said second and third rows;

fourth corner electrode means coupled with said resistive layer at the juncture of said second and fourth rows; and an enhanced conductivity region intermediate said active area and said electrodes.

6. The improved graphics tablet of claim 5 wherein the bulk resistivity of said enhanced conductivity region is different from the bulk resistivity of said active region.

7. An electrographic system comprising:

an electrically insulative substrate;

a resistive layer supported upon said insulative substrate and having an active area extending to an x— coordinate direction between first and second spaced apart edges and extending in a y— coordinate direction between third and fourth spaced-apart edges;

a first row of discrete, spaced-apart electrodes electrically coupled with said resistive layer intermediate said active area and said first edge;

a second row of discrete, spaced-apart electrodes electrically coupled with said resistive layer intermediate said active area and said second edge;

a third row of discrete, spaced-apart electrodes electrically coupled with said resistive layer intermediate said active area and said third edge;

a fourth row of discrete, spaced-apart electrodes electrically coupled with said resistive layer intermediate said active area and said fourth edge;

an enhanced conductivity region intermediate said active area and said electrodes;

first corner electrode means coupled with said resistive layer at the juncture of said first and third rows;

second corner electrode means coupled with said resistive layer at the juncture of said first and fourth rows;

third corner electrode means coupled with said resistive layer at the juncture of said second and third rows;

fourth corner electrode means coupled with said resistive layer at the juncture of said second and fourth rows;

a position locator adjacent said active area;

a time varying excitation source of select frequency;

a ground reference;

switching means for applying said ground reference to said first row of electrodes and to said first and second corner electrodes and simultaneously appying said source to said second row of electrodes and to said third and fourth corner electrodes and electrically isolating said third and fourth rows of electrodes during a first operational mode, for reversing said applications of said ground reference and said source to said first and second rows of electrodes and to said first, second, third and fourth corner electrodes and maintaining said electrical isolation of said third and fourth rows of electrodes during a second operational mode, for applying said ground reference to said third row of electrodes and to said first and third corner electrodes and simultaneously applying said source to said fourth row of electrodes and to said second and fourth corner electrodes and electrically isolating said first and second rows of electrodes during a third operation mode, and for reversing said applications of said ground reference and said source to said third and fourth rows of electrodes and to said first, second, third, and fourth corner electrodes and maintaining said electrical isolation of said first and second rows of electrodes during a fourth operational mode; and control means for collecting a signal from said position locator.

8. An electrographic system comprising:

an electrically insulative substrate;

a resistive layer supported upon said insulative substrate and having an active area extending in an x— coordinate direction between first and second spaced apart edges and extending in a y— coordinate direction between third and fourth spaced-apart edges;

a first row of discrete, spaced-apart electrodes electrically coupled with said resistive layer intermediate said active area and said first edge;

a second row of discrete, spaced-apart electrodes electrically coupled with said resistive layer intermediate said active area and said second edge;

a third row of discrete, spaced-apart electrodes electrically coupled with said resistive layer intermediate said active area and said third edge;

a fourth row of discrete, spaced-apart electrodes electrically coupled with said resistive layer intermediate said active area and said fourth edge; an enhanced conductivity region intermediate said active area and said electrodes;

first corner electrodes means coupled with said resistive layer at the juncture of said first and third rows;

second corner electrode means coupled with said resistive layer at the juncture of said first and fourth rows;

third corner electrode means coupled with said resistive layer at the juncture of said second and third rows;

fourth corner electrode means coupled with said resistive layer at the juncture of said second and fourth rows;

a time varying excitation source of select frequency;

a position locator adjacent said active area for inputting said source at a select position in said active area;

signal treatment means;

a ground reference; and switching means for applying said ground reference to said first row of electrodes and to said first and second corner electrodes and simultaneously appying said signal treatment means to said second row of electrodes and to said third and fourth corner electrodes and electrically isolating said third and fourth rows of electrodes during a first operational mode, for reversing said applications of said ground reference and said signal treatment means to said first and second rows of electrodes and to said first, second, third and fourth corner electrodes and maintaining said electrical isolation of said third and fourth rows of electrodes during a second operation mode, for applying said ground reference to said third row of electrodes and to said first and third corner electrode and simultaneously applying said signal treatment means to said fourth row of electrodes and to said second and fourth corner electrodes and electrically isolating said first and second rows of electrodes during a third operational mode, and for reversing said applications of said ground reference and said signal treatment means to said third and fourth rows of electrodes and to said first, second, third, and fourth corner electrodes and maintaining said electrical isolation of said first and second rows of electrodes during a fourth operational mode.

* * * * *